United States Patent [19]

Harrison et al.

[11] Patent Number: 5,592,439
[45] Date of Patent: Jan. 7, 1997

[54] SELF-CENTERING DUAL SHUTTLE AIR GUN

[75] Inventors: E. R. Harrison, Plano; Philip J. Jenkins, deceased, late of Pearland, both of Tex., by Victoria G. Jenkins, executrix

[73] Assignee: I/O Exploration Products (U.S.A.), Inc., Stafford, Tex.

[21] Appl. No.: 393,721

[22] Filed: Feb. 24, 1995

[51] Int. Cl.⁶ .................................................. H04R 23/00
[52] U.S. Cl. ........................... 367/144; 181/115; 181/120
[58] Field of Search ........................... 367/144; 181/115, 181/120

[56] References Cited

U.S. PATENT DOCUMENTS

| | | | |
|---|---|---|---|
| 4,623,033 | 11/1986 | Harrison | 367/144 |
| 5,001,679 | 3/1991 | Harrison | 367/144 |
| 5,263,007 | 11/1993 | Jenkins | 367/144 |
| 5,365,493 | 11/1994 | Harrison | 367/144 |

*Primary Examiner*—J. Woodrow Eldred
*Attorney, Agent, or Firm*—Tim Headley; John Moetteli; Haynes and Boone, L.L.P.

[57] ABSTRACT

An air gun for releasing compressed air into the environment. Two opposing shuttle valves selectively open ports to release compressed air more quickly from the air gun. A centering mechanism returns the first and second shuttle valves to the initial position. The centering mechanism can comprise a pressure compensation system or mechanical stop for positioning the first and second shuttles at the selected position.

6 Claims, 2 Drawing Sheets

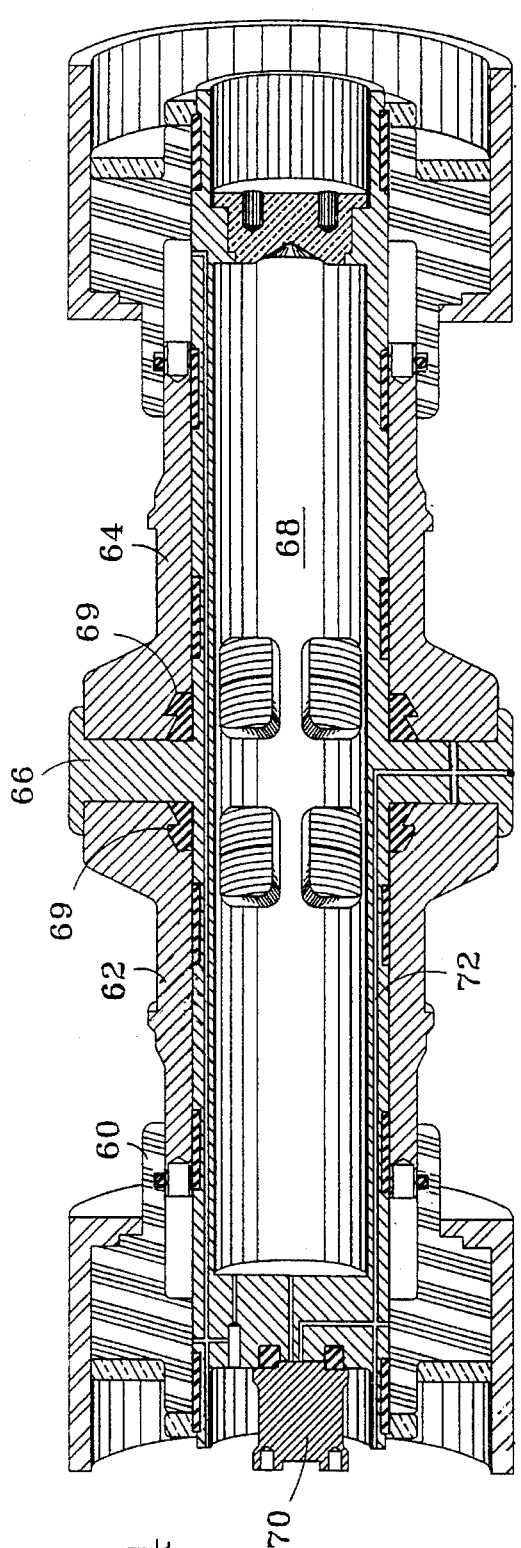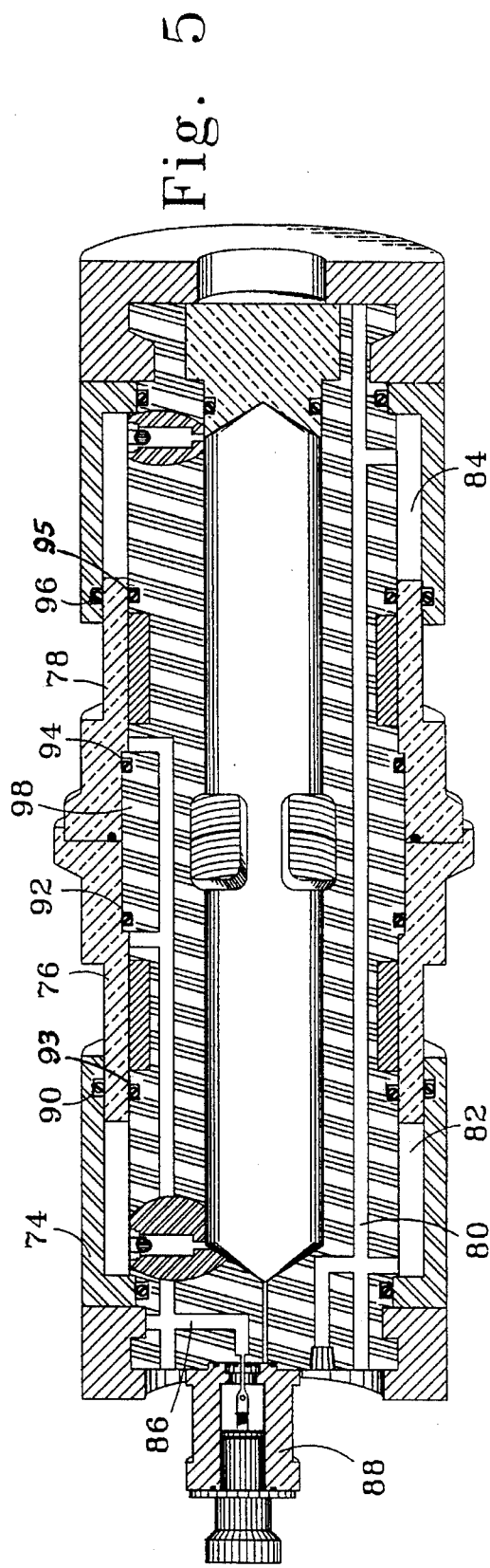

SELF-CENTERING DUAL SHUTTLE AIR GUN

BACKGROUND OF THE INVENTION

The present invention relates to air guns in marine seismic operations. More particularly, the present invention relates to a dual shuttle air gun that centers the air gun shuttles after compressed air in the gun is discharged.

Marine seismic operations record acoustic waves reflected from the sea floor and underlying geologic formations. The acoustic waves are generated by air guns that release air compressed between 2000 and 6000 psi. The acoustic pulse generated by a single air gun is magnified by additional air guns in a seismic array to produce large acoustic waves. These acoustic waves are reflected from the sea floor and geologic formations and are sensed by recording instruments having transducers for converting the acoustic waves into electrical signals. These signals are recorded and subsequently processed to model the subsurface geologic formations.

Conventional air guns store compressed air in a housing that is released through valved ports in the housing. The released air forms a bubble in the water to create an acoustic pressure pulse. An electrically operated solenoid controls the operation of the valves and release of compressed air. One example of an air gun is shown in U.S. Pat. No. 4,623,033 to Harrison, Jr. (1986), wherein an air gun includes valved ports extending 360 degrees around the air gun housing. The port valve comprises a shuttle that reciprocates axially along the air gun.

U.S. Pat. No. 5,365,493 to Harrison (1994) describes an improved air gun that accelerates the shuttle as the air gun is fired. Another air gun design in shown in U.S. Pat. No. 5,001,679 to Harrison, Jr. (1991), wherein the compressed air is released from the housing by the operation of dual shuttles. This dual shuttle concept increases the efficiency of the air gun by expediting the release of compressed air from the housing when the gun is fired. Both shuttles are simultaneously operated to release the compressed air and the shuttles are returned to the original position.

Although improved air guns significantly improve the efficient generation of acoustic waves, the weight and response of air guns can be improved to facilitate the deployment of the air guns and to improve the acoustic wave quality. Accordingly, a need exists for an improved air gun that accomplishes these objectives.

SUMMARY OF THE INVENTION

The present invention provides an improved dual shuttle air gun for use in seismic operations. The invention describes an air gun, for releasing compressed air into the environment, which comprises a housing defining a chamber for storing the compressed air from the chamber, a port in the housing for releasing the compressed air into the environment, a first valve movable relative to the housing for selectively closing a portion of the port, a second valve movable relative to the housing for cooperating with the first valve to close the port in an initial charged position, an actuator for moving the first and second valves to release the compressed air through the port, and a centering mechanism for returning the first and second valves to the initial charged position.

In other embodiments of the invention, the valves can comprise first and second shuttles axially movable relative to the housing. A centering mechanism positions the first and second shuttles at the initial charged position. The centering mechanism can comprise a stop attached to the housing or can comprise tapered surfaces on the first and second shuttles in contact with compressed air for creating a pressure imbalance across the first and second shuttles and for urging the first and second shuttles toward the initial charged position.

BRIEF DESCRIPTION OF THE DRAWINGS

FIG. 4 illustrates another embodiment of the invention wherein the movable shuttles are centered with a fixed stop.

FIG. 5 illustrates another embodiment of the invention showing an alternative embodiment of a fixed stop.

DESCRIPTION OF THE PREFERRED EMBODIMENTS

Figure 1:
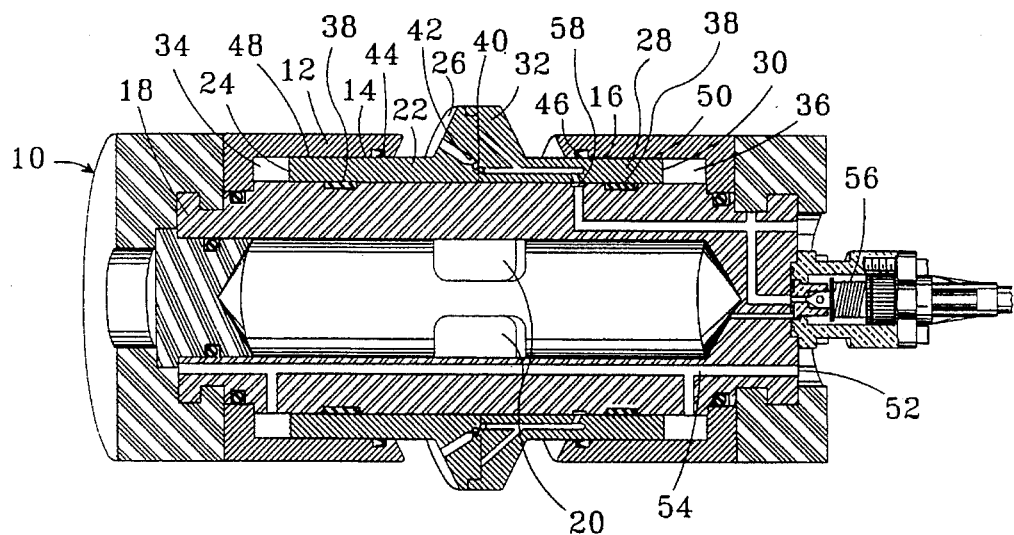
FIG. 1 illustrates one embodiment of the invention wherein the movable shuttles include tapered surfaces for creating an area differential for contacting compressed air and for urging the shuttles toward an initial charged position.

The present invention furnishes an improved air gun that incorporates two shuttle valves or shuttles. FIG. 1 illustrates air gun 10 generally comprising housing 12, first valve or shuttle 14, and second valve or shuttle 16. Housing 12 includes tubular barrel 18 for storing compressed air in the defined chamber space, and ports 20 are positioned in the walls of barrel 18 to selectively control the release of the compressed air.

First shuttle 14 is generally shaped as an annular ring around barrel 18 and includes cylindrical body 22 and guide end 24. Contact end 26 of first shuttle 14 is located opposite guide end 24. Second shuttle 16 is generally shaped as an annular ring around barrel 18 having cylindrical body 28 and guide end 30. Contact end 32 of second shuttle 16 is located opposite guide end 30. As illustrated, contact end 26 of first shuttle 14 reciprocates within housing cavity 34, and contact end 32 of second shuttle 16 reciprocates within housing cavity 36. Wear rings 38 reduce friction and wear between housing 12 and first shuttle 14 and second shuttle 16.

As shown in FIG. 1, contact end 26 and contact end 32 meet across contact surface 40. Seal 42 prevents leakage of compressed air therebetween. Seals 44 and 46 further contact tapered surfaces 48 and 50 to prevent leakage of compressed air into the ambient environment.

Port 52 is attached to a compressed air source (not shown) and directs compressed air into channel 54. When housing 12 is empty, channel 54 transports the compressed air to simultaneously fill housing cavity 34, housing cavity 36 and the interior chamber of barrel 18. As compressed air enters cavity 34 and cavity 36, the compressed air simultaneously acts against guide end 24 of first shuttle 14 and against guide end 30 of second shuttle 16. The force created by the compressed air acting against these surfaces urges first shuttle 14 and second shuttle 16 toward the initial charged position shown in FIG. 1.

Figure 2:
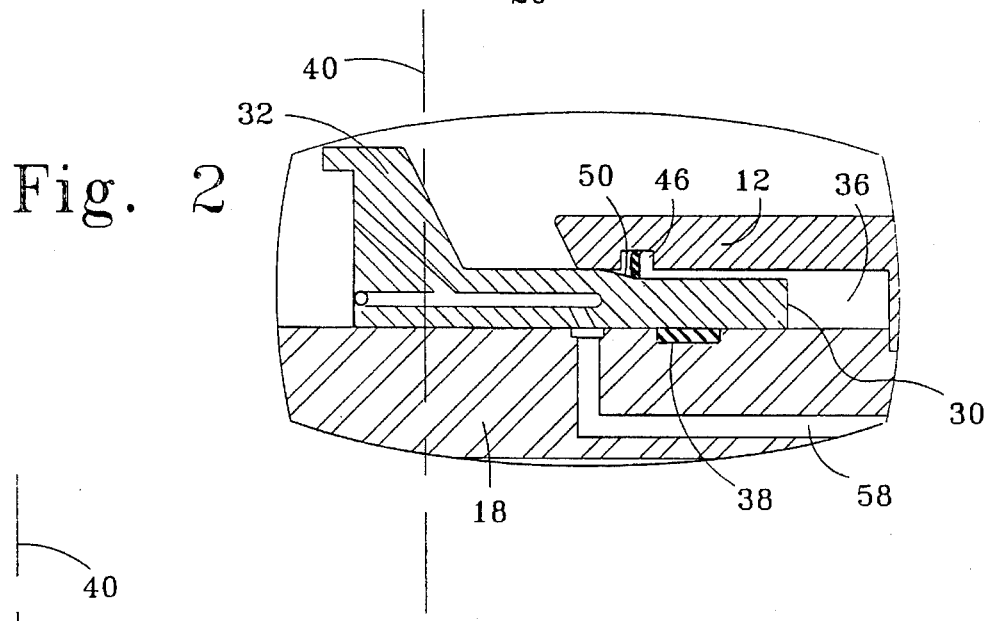
FIGS. 2 and 3 illustrate detailed sectional views of a tapered surface for a movable shuttle.
Figure 3:
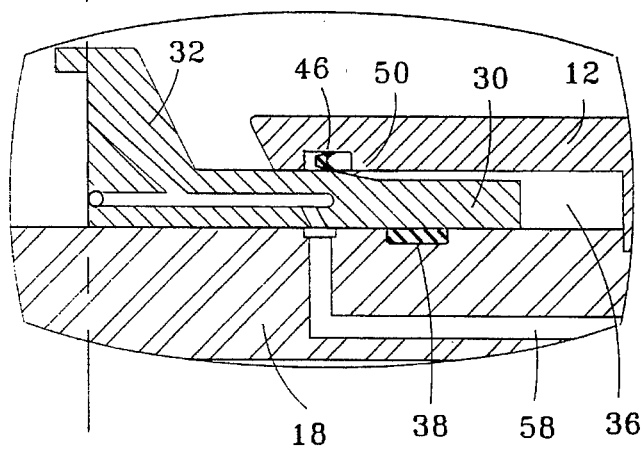

Referring to FIGS. 2 and 3, details of contact end 32 and tapered surface 50 are shown. Tapered surface 50 contacts seal 46 and progressively presents a different profile area to the compressed air depending on the position of second shuttle 16. If second shuttle 16 is overextended out of housing cavity 36 and toward first shuttle 14 as shown in FIG. 2, tapered surface 50 of contact end 32 for second shuttle 16 presents a smaller surface area than the surface area of contact end 24 for first shuttle 14. Because the compressed air in cavity 34 is acting on a greater surface area than on the surface area of cavity 36 in this example, a differential force is created to urge first shuttle 14 toward the initial charged position within cavity 36, as shown in FIG. 3. Similarly, an opposing force results if first shuttle 14 is overextended out of housing cavity 34.

Actuator 56 is illustrated as a solenoid valve electrically actuated by a switch and power source (not shown). Actuator 56 causes compressed air to be introduced into channel 58 which in turn is routed to contact surface 40. When compressed air contacts surface 40, which was initially at ambient pressure, a much larger area is exposed to the compressed air pressure so that first shuttle 14 and second shuttle 16 are separated to open ports 20 and to release the compressed air into the environment.

FIG. 4 illustrates another embodiment of the invention wherein housing 60 is engaged with first shuttle 62 and second shuttle 64. Flange 66 is attached to housing 60 and substantially bisects the inner chamber 68 of housing 60. Seals 69 are positioned between flange 66, first shuttle 62, and second shuttle 64. Flange 66 provides a positive stop that prevents contact between first shuttle 62 and second shuttle 64, and further reduces the travel of such shuttles within a defined range of movement. As illustrated in FIG. 4, actuator 70 provides compressed air through passage 72 to contact and to dislodge the surfaces of first shuttle 62 and second shuttle 64 in contact with flange 66 so that the compressed air in chamber 68 is released into the ambient environment. First shuttle 62 and second shuttle 64 continue to accelerate during the opening sequence so that a large amount of air is rapidly discharged to generate a high acoustic pressure wave. This feature determines the shuttle opening velocity and the corresponding port opening and air discharge rates.

FIG. 5 illustrates another air gun embodiment having a different stop configuration. Housing 74 is engaged with first shuttle 76 and with second shuttle 78. Air passage 80 directs compressed air to chambers 82 and 84, and air passage 86 directs compressed air from actuator 88 to the regions defined between seals 90 and 93, and between 94 and 95. This actuation separates first shuttle 76 from contact with second shuttle 78 and permits the release of compressed air from the interior of housing 74 as previously described. Flange 98 provides the same function described for flange 66 in the embodiment shown in FIG. 3.

It will be appreciated that numerous combinations and configurations of the inventive elements described herein can be made. For example, the actuator for initiating the separation of the first and second shuttles can comprise hydraulic, electrical, pneumatic, or mechanical devices suitable for urging the shuttles from the intial charged position. Additionally, the centering mechanism for the shuttles can comprise a floating configuration as shown in FIG. 1, can comprise a fixed stop as shown in FIGS. 4 and 5, or can comprise other structural combinations useful for accomplishing the intended result.

Although the invention has been described in terms of certain preferred embodiments, it will become apparent to those of ordinary skill in the art that modifications and improvements can be made to the inventive concepts herein without departing from the scope of the invention. The embodiments described herein are merely illustrative of the inventive concepts and should not be interpreted as limiting the scope of the invention.

What is claimed is:

1. An air gun for releasing compressed air into the environment, comprising:

a housing defining a chamber for storing the compressed air and further defining a port for permitting the release of the compressed air from the chamber into the environment;

a first valve, having a first tapered surface, movable relative to the housing for selectively closing a portion of the port;

a second valve, having a second tapered surface, movable relative to the housing for cooperating with the first valve to close the port in an initial charged position to permit the placement of compressed air into the housing chamber;

an actuator for moving the first valve and the second valve to open the port to permit the release of the compressed air into the environment;

a first seal between the housing and the first tapered surface, the first seals, the housing, and the first tapered surface defining a first charging chamber;

a second seal between the housing and the second tapered surfaces, the second seal, the housing, and the first tapered surface defining a second charging chamber;

wherein the first and second charging chambers are operable for being charged with compressed air for urging the first and second valves into the initial charged position; and wherein the surface area of the first and the second tapered surfaces in contact with the compressed air increases as the first and second valves move from the initial charged position so that the first and second valves are biased to return to the initial charged position.

2. An apparatus as recited in claim 1, further comprising a first seal between said first valve and said housing, and further comprising a second seal between said second valve and said housing.

3. An air gun for releasing compressed air into the environment, comprising:

a housing defining a chamber for storing the compressed air and further defining a port for permitting the release of the compressed air from the chamber into the environment, wherein the port is substantially located in position bisecting the chamber;

a first shuttle, having a first tapered surface, axially movable relative to the housing for selectively closing a portion of the port in an initial charged position;

a second shuttle, having a second tapered surface, axially movable relative to the housing for selectively closing a portion of the port in an initial charged position, wherein the first and second shuttles cooperate across a sealing face in the initial charged position to seal the port;

an actuator for moving said first and second shuttles from said initial charged position to permit the release of the compressed air through said port and into the environment; and wherein the compressed air generates a differential pressure across the tapered surfaces for urging the first and second shuttles to return to the initial charged position.

4. An apparatus as recited in claims 3, wherein said centering mechanism comprises tapered surfaces on said first and second shuttles for contacting the compressed air acting on said centering mechanism, wherein the differential pressure acting across said tapered surfaces urges said first and second shuttles toward said initial charged position.

5. An apparatus as recited in claim 4, further comprising a first seal positioned between said housing and the tapered surface of said first shuttle, and comprising a second seal positioned between said housing and the tapered surface of said second shuttle.

6. An apparatus as recited in claim 3, wherein said first and second shuttles are in contact across a surface in said initial charged position, and wherein said actuator furnishes compressed air across said surface to move said first and second shuttles from said initial charged position.

* * * * *

UNITED STATES PATENT AND TRADEMARK OFFICE
CERTIFICATE OF CORRECTION

PATENT NO. :     5,592,439
DATED      :     January 7, 1997
INVENTOR(s) :    E. R. Harrison, et al.

It is certified that error appears in the above-identified patent and that said Letters Patent is hereby corrected as shown below:

Col. 4, line 26, "seals" should read --seal--.
Col. 4, line 29, "surfaces" should read --surface--.

Signed and Sealed this

Twenty-second Day of April, 1997

Attest:

BRUCE LEHMAN

*Commissioner of Patents and Trademarks*

*Attesting Officer*